United States Patent [19]
Giordano

[11] Patent Number: 5,642,247
[45] Date of Patent: Jun. 24, 1997

[54] AUTOMATIC FAULT MONITORING SYSTEM AND MOTOR CONTROL SYSTEM INCORPORATING SAME

[75] Inventor: Raymond Louis Giordano, Flemington, N.J.

[73] Assignee: Harris Corporation, Palm Bay, Fla.

[21] Appl. No.: 505,695

[22] Filed: Jul. 21, 1995

[51] Int. Cl.$^6$ .................................................. H02H 5/04
[52] U.S. Cl. ............................... 361/31; 361/110; 363/56; 318/434
[58] Field of Search ............................... 361/23, 24, 28, 361/29, 30, 31, 33, 110; 363/56; 324/537; 318/283–284, 293, 434

[56] References Cited

U.S. PATENT DOCUMENTS

| 5,081,404 | 1/1992 | Kelley et al. | 318/434 |
| 5,111,123 | 5/1992 | Hach et al. | 318/434 |

OTHER PUBLICATIONS

M. Izadinia, et al., "A Next Generation High Performance CMOS/BIPOLAR/DMOS H–Switch Motor–Con", pp. 301–309, Oct. 1988.

"LMD 18245 3A, 55V DMOS Full–Bridge Motor Driver", National Semiconductor, Dec. 1993.

*Primary Examiner*—Jeffrey A. Gaffin
*Assistant Examiner*—Michael J. Sherry
*Attorney, Agent, or Firm*—Nixon, Hargrave, Devans & Doyle

[57] ABSTRACT

An automatic fault monitoring system prevents the detection of fault conditions during operating modes or conditions that can produce false fault conditions. A motor control system that utilizes an H-bridge circuit having active devices, preferably field effect transistors, in each arm of the bridge. The motor is connected in the leg of the bridge. Currents and voltages are sensed in each arm as different operating conditions represented by input control signals, which may be computer generated, drive the bridge and place the transistors in different states (on or off). Such operating conditions include rotation of the motor in opposite directions and reversal of direction. Fault detection logic is responsive to currents and voltages in the arms and leg of the bridge and provides outputs indicative of over-current fault conditions in the arm and open circuit fault conditions in the leg. Fault detection control logic analyzes the input control signals and also applies them to change the state of the transistors in the H-bridge. When the control signal inputs and the sequence in which they occur represents a command to the H-bridge to reverse the direction of rotation of the motor, the fault detection logic is inhibited thereby preventing false detection of over-current conditions that can occur in response to the back EMF generated by the motor as it stalls and stops briefly while reversing direction of rotation. The fault detection control logic also enables the detection of open load fault condition during states where the motor is being driven in either direction of rotation, but not when a reversal of rotation is occurring or the motor is started from a stopped position and the current in the motor must build exponentially.

16 Claims, 3 Drawing Sheets

AUTOMATIC FAULT MONITORING SYSTEM AND MOTOR CONTROL SYSTEM INCORPORATING SAME

DESCRIPTION

The present invention relates to automatic fault monitoring systems and particularly to fault monitoring systems for prevention of the detection of false faults during certain operating conditions of a circuit that is being monitored.

The invention is especially suitable for use in a motor control system wherein the motor is contained in the leg of an H-bridge circuit having active devices, such as field effect transistors, in each arm of the bridge and enables the monitoring system and the H-bridge circuit to be fabricated as an integrated circuit chip. A monitoring system provided by the invention provides detection of fault conditions such as over-currents; open load (an open circuit in the leg of the bridge containing the motor), which is universally applicable for controlling and monitoring motors of various types and/or having different internal resistances and inductance (time constants) without redesigning the H-bridge; and the circuits for sensing over-current and open load conditions therein.

In order to protect a driving circuit that drives a load such as a motor, fault conditions have to be detected. Such fault conditions may include open load faults and over-current faults where currents which exceed load rating or the rating of components in the driving circuit may occur. A motor is often operated by a H-bridge circuit that contains transistors that are switched between on and off states and cause current to flow through the motor in opposite directions so that the motor rotates in opposite directions. The states of the transistor are controlled by logic circuits. Over-current conditions are detected and fed back to the logic circuits so as to power down the H-bridge and prevent damage to the motor or the transistors. Such circuits are described in an article by M. Izadinia, et al., which appeared in the magazine "MOTOR-CON," October 1988 Proceedings, published by Intertech Communications, Inc. Such motor bridge circuits are also commercially available from National Semiconductor Corporation, Santa Clara, Calif. and are described in their product literature for the LMD 18245, December 1993.

Fault detection in load operating circuits, such as H-bridge drivers, sometimes detect false faults under certain load-motor operating conditions. For example, the currents applied to a motor that is initially stopped will increase exponentially upon turn on. The time constant of the current build-up is a function of the resistance of the bridge transistors in their on state and the resistance and inductance of the motor. As the motor reverses direction of rotation (another operating condition), the back EMF of the motor will cause a false over-current in the motor as the motor cycles in reversing direction through its stall position. Thus, false fault conditions may be detected if the motor is started from a stop position or reversed in direction. These erroneous faults are due to initially low or high current flow in the motor and can be mistaken as open load or over-current failures. Different motors have different fault modes, particularly because their time constance of current buildup varies from motor to motor depending upon the internal resistance and inductance thereof. Accordingly, fault detection circuits have to be tailored for specific loads, such as specific motors, to avoid false faults.

It has been discovered, in accordance with the invention, that the false fault conditions may be identified through an analysis of the input control signals that control the different operating conditions of the load. Fault detection control logic may then be enabled or inhibited during certain windows of time as represented by the control signals and/or sequences of such control signals. The fault detection control logic then provides windows of time during which faults are monitored. Accordingly, when monitored, the likelihood of erroneous faults being present and providing erroneous fault detection is minimized. The provisions of windows of time for fault detection makes fault monitoring facilities, which are provided in accordance with the invention, load independent. Thus, the same monitoring system and motor control system including the monitoring system may be used with different loads and motors.

The input control signals represent certain states in which the transistors in the H-bridge are on and off. When off the transistors are in their high impedance (high Z) condition. In accordance with the invention, the driving circuit is implemented such that over-current fault detection is monitored at all times and during all states except the states that occur in a sequence to obtain reversal of motor direction of rotation. Open circuit fault detection in the motor is monitored during states that correspond to rotation of the motor, except when the motor turns on from a high Z state or for the sequence of states where the motor reverses its direction of rotation. During the time window that the motor reverses its direction of rotation, fault detection is inhibited. The motor control system may incorporate means for limiting over-currents and thermal shutdown that provide sufficient protection for the driver circuit at such times. The input control signals may be generated by a computer (a microprocessor controller) that sets the intervals during which the driving circuit remains in states corresponding to opposite directions of rotation when reversing the motor. The H-bridge and the other logic circuits which receive inputs from the microprocessor controller may be implemented with integrated circuit (CMOS) technology on a single chip wherein the transistors in the H-bridge may be implemented preferably as NDMOS field effect transistors.

Accordingly, it is the principal object of the invention to provide an improved system for monitoring a circuit that drives a load and particularly where the load is a motor and the driving circuit is an H-bridge.

It is another object of the invention to provide an improved system for monitoring faults in a load and a circuit for driving the load wherein false faults that accompany selected operating conditions or sequences of conditions are substantially eliminated.

It is a still further object of the invention to provide an improved motor control circuit and particularly a circuit wherein an H-bridge having transistors and a motor subject to over-current, for example short circuits and open circuits (particularly in the motor windings) and wherein false over-current and open circuit conditions constituting false faults are unlikely to be detected.

Briefly described, a system for monitoring a circuit that drives a load in response to control signals that select from a plurality of load operating conditions for fault conditions in the circuit, which implements the invention, comprises means in the circuit being monitored that provides a plurality of outputs representing the operating conditions of the circuit. Means are also provided in the monitoring system for detecting fault conditions. Means responsive to the control signals enables and inhibits the fault detecting means and prevents operation thereof upon selection of certain of the operating conditions as represented by the control signals. In a preferred implementation, the circuit that drives the load is an H-bridge driver and the load is a motor, particularly a DC motor that may be driven in opposite directions of rotation depending upon the control signals. The control signals may also control the speed of the motor by modulating pulses of current that are applied via the H-bridge through the motor. The control signals may be applied via the enabling and inhibiting means, which may be in the form of logic circuits, that generate levels during intervals of time (window or gate signals) that prevent fault condition detection, even though the current in the arms of the bridge and the motor in the leg of the bridge is being monitored continuously. The fault detection means may also be connected to the control electrodes (gates), in the case of FET transistors, so as to control the gate voltages thereby limiting current in the H-bridge upon detection of overcurrent fault events.

The foregoing and other objects, features and advantages of the invention will become more apparent from a reading of the following description in connection with the accompanying drawings in which.

Figure 1:
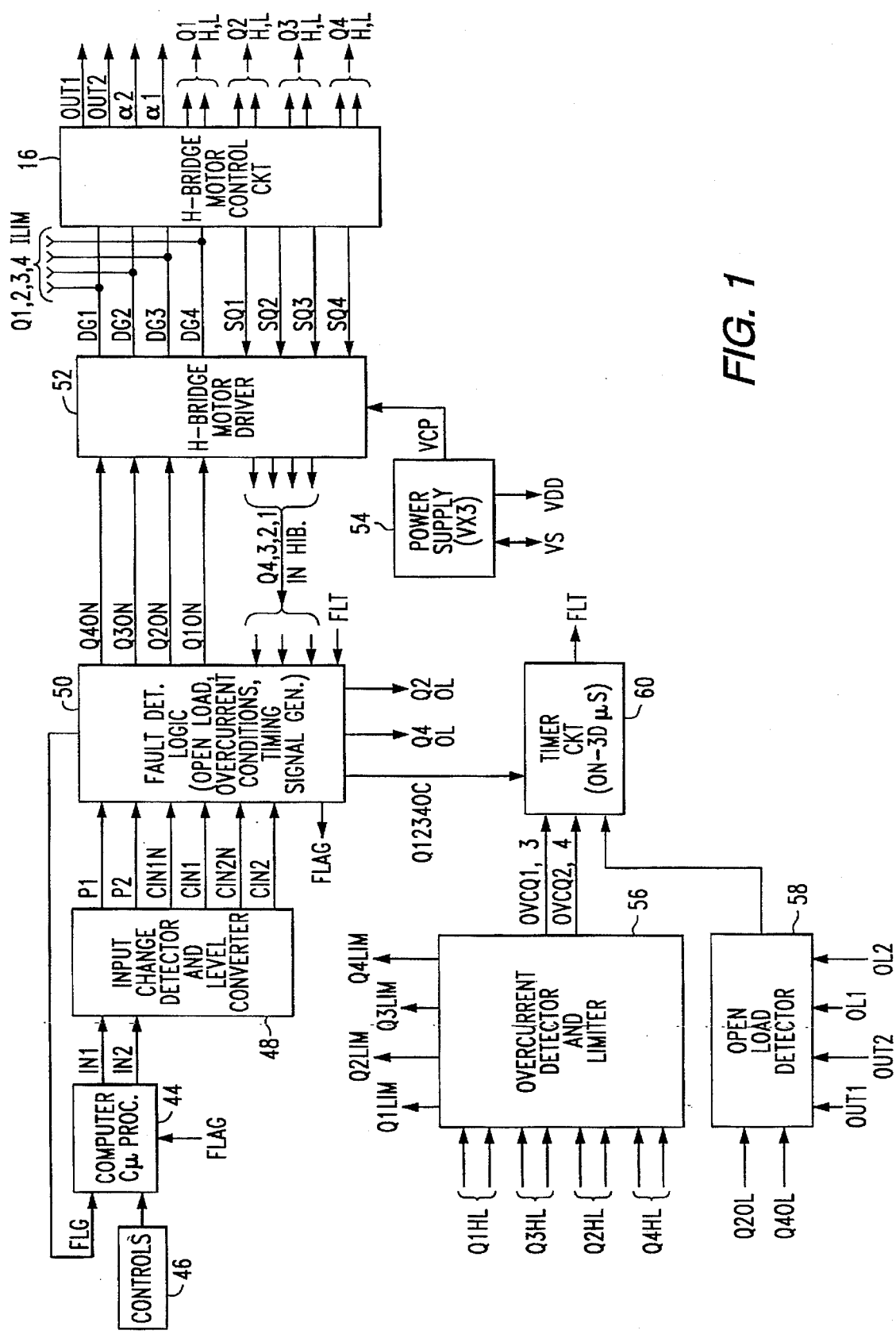
FIG. 1 is a block diagram of a motor control system having an H-bridge motor control or driver circuit that embodies fault monitoring facilities in accordance with the invention.
Figure 2:
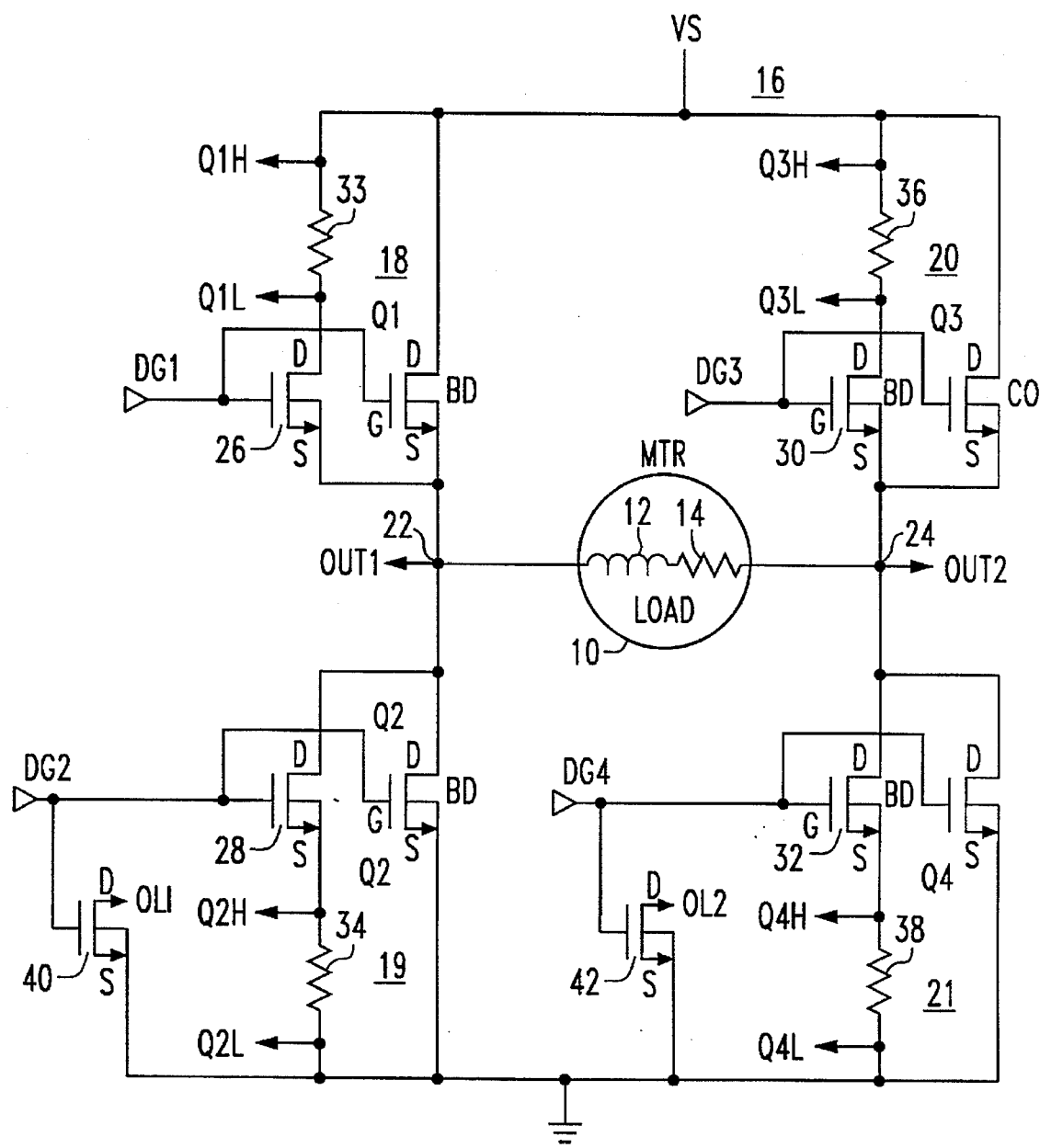
FIG. 2 is a schematic diagram of the H-bridge drive circuit with the motor in the cross-leg thereof.

Referring now more particularly to FIG. 1, there is shown a motor control system having fault detection for overcurrent and open load (the motor being the load) conditions. The motor load 10 is shown in FIG. 2 and is represented by its internal inductance 12 and resistance 14. The circuit that drives the load is an H-bridge motor control circuit 16 having pairs of arms 18, 19 and 20, 21. The motor 10 is in the leg of the H-bridge 16 between the corners of the bridge 22 and 24 between which the motor leg is connected. These corners 22 and 24 are the opposite ends of the leg.

The arms have active devices that are preferably NDMOS transistors Q1 in arm 18, Q2 in arm 19, Q3 in arm 20, and Q4 in arm 21. Such transistors have sufficient channel width to carry current sufficient to drive the motor in opposite directions. The current supplied is DC current from a source indicated at Vs. The transistors, as indicated by the symbols used in the figures, preferably have internal clamp diodes. The transistors have gate, source, drain, and body drain terminals or electrodes marked G, S, D and BD, respectively.

Current monitoring transistors 26, 28, 30 and 32 are connected across the transistors Q1, Q2, Q3 and Q4, respectively. Each of these monitoring transistors has a current sensing resistor 33, 34, 36 and 38 connected in series therewith and the series combination of the transistors and their sensing resistors are connected across (from source to drain) the transistors Q1, Q2, Q3 and Q4. The monitoring transistors 26, 28, 30 and 32 have much narrower channel widths than the primary transistors Q1, Q2, Q3 and Q4 and shunt a proportional but much smaller current than passes through the primary arm transistors Q1, Q2, Q3 and Q4. Terminals connected across these transistors provide outputs between which voltages representing the currents flowing through the primary transistors are present. Considering the high side and low side (VS being the high side and ground being the low side) of the circuit 16, these terminals are designated in the case of the resistor 33 which provides outputs monitoring the current through Q1, as Q1H and Q1L. The other terminals across the other sensing resistors 34, 36 and 38 are similarly marked with H or L to designate the high and low sides of the circuit.

The arms 19 and 21 which are connected between the opposite ends 22 and 24 of the leg containing the motor 10 and ground have additional monitoring transistors 40 and 42 of the NDMOS type. The gates of these transistors 40 and 42 are connected to the gates of the other transistors in their respective arms. The sources of these transistors 40 and 42 are connected to the sources of the transistors Q2 and Q4 in their respective arms 19 and 21. A time window is established with signal Q2OL from the Fault Detector 50 when current flows from VS thru Q3, motor 10, Q2 and ground. During time window Q2OL a reference current from open load detector 58 flows between drain and source of transistor 40 establishing a reference voltage at OL1 on the drain of transistor 40. The reference voltage is compared against the voltage at OUT1 in 58 for an open load condition. Similarly a time window Q4OL is established when current flows from VS thru Q1, motor 10, Q4 and ground and the reference voltage established at OL2 is compared against the voltage OUT2 in 58 for an open load condition.

All of the NDMOS circuits and the circuits in the system shown in FIG. 1 for motor control and fault monitoring, except a control computer 44 having a microprocessor and the motor 10, may be fabricated as an integrated circuit chip using CMOS technology, in a preferred embodiment of the invention.

As shown in FIG. 1, controls 46 provide commands to the computer 44 to turn on the motor, control its direction and speed, and result in the computer generating input control signals IN1 and IN2. These input signals are processed in an input signal change detector and level converter 48 having logic circuits that detect changes in the state of the input signals (from high to low level and vice versa) and delayed, as by a few microseconds. These signals appear at the output of the detector and level converter 48 as pulses P1 and P2 (P1 delayed). The levels of the input signals are converted to logic levels used in fault detection control logic circuits 50 and appear in level shifted and inverted form, CIN1 and CIN1N (for the not or inverted form of CIN1 ). The IN2 input control signals appear in level shifted and inverted form as CIN2 and CIN2N.

Figure 3:
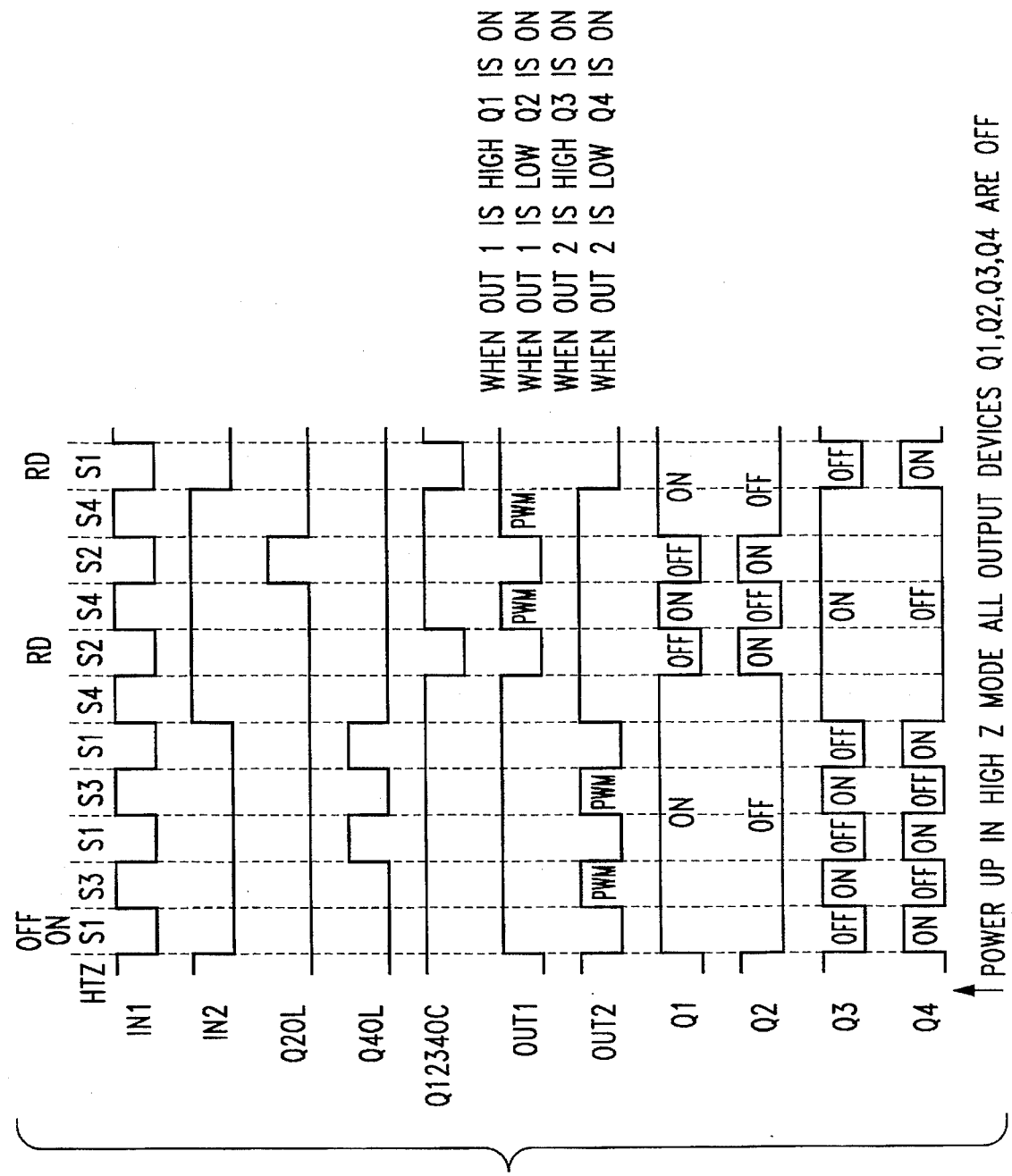
FIG. 3 is a series of timing or waveform diagrams showing input control signals and signals resulting therefrom that appear at various inputs and outputs of the circuits and components illustrated in FIGS. 1 and 2.

The control input signals IN1 for a typical succession of such signals is shown in FIG. 3 along line IN1. A typical control input signal IN2 is shown in FIG. 3 along line IN2. The levels of IN1 shift between low and high level and the intervals between shifts vary to provide a pulse width modulated pulse train that controls the average current through the motor 10 and, therefore the speed of the motor. The direction of rotation of the motor is controlled by control input signal IN2. When the motor is initially off, the transistors Q1, Q2, Q3 and Q4 are off and in their high impedance (high Z) state. When motor rotation in one direction is commanded, IN2 is in one state (L for low) or in the opposite state (H for high).

When the system is powered up, the fault detection control logic 50 outputs, which are forwarded to the H-bridge transistor gate inputs, DG1, DG2, DG3 and DG4 via an H-bridge motor driver 52, turn off all of the transistors Q1, Q2, Q3 and Q4, placing them in the high Z state. The transistors are also placed in the high Z state, when a fault (FLT) condition is detected, the fault detection control logic 50 provides outputs Q1ON, Q2ON, Q3ON and Q4ON which are forwarded via the bridge motor drivers and converted to driving levels for the gates of the transistors in the H-bridge 16 in the H-bridge motor driver 52. The fault detection logic also provides an output FLAG when a fault input FLT thereto indicating detection of a fault condition occurs. Then the computer, in accordance with its program, may reset the system and try driving the motor again in accordance with the inputs from the controls 46. After a number of tries, the computer may shut down the system by putting it into its fault (FLT) state and provide an audible or visible alarm indication. The operation of the computer to retry or even automatically to control the system without controls 46 may be implemented by suitable programming of the computer 44.

The various states dictated by the input control signals IN1 and IN2 and the FLT signal are indicated in Table 1. Table 1 also shows the states of the transistors Q1, Q2, Q3 and Q4 for each of the states dictated by the input signals and the fault signal and also the level at the outputs OUT1 and OUT2 across the leg of the bridge containing the motor 10.

TABLE 1

| STATE | IN1 | IN2 | Q1 | Q2 | Q3 | Q4 | OUT1 | OUT2 |
| --- | --- | --- | --- | --- | --- | --- | --- | --- |
| S1 | L | L | ON | OFF | OFF | ON | H | L |
| S2 | L | H | OFF | ON | ON | OFF | L | H |
| S3 | H | L | ON | OFF | ON | OFF | H | H |
| S4 | H | H | ON | OFF | ON | OFF | H | H |
| FLT | — | — | OFF | OFF | OFF | OFF | HIZ | HIZ |

An external power supply or source supplies VS power to the chip. An on chip power supply 54 contains a level converter or charge pump circuit and also another low voltage supply VDD derived from power source VS. The voltage from the charge pump VCP may be three times the voltage VS. For example, VS may be five volts and VCP 15 volts. VCP increases the gate drive voltages DG1 and DG3 so that they are above VS and are capable of turning Q1 and Q3 on in a low impedance state. Since the drains of Q2 and Q4 will be lower than VS due to the voltage drops in Q3 and the motor 10, boosting of the gate voltages to Q2 with VCP in the driver 52 is unnecessary. Similarly, boosting of DG4 is also unnecessary and the logic levels appearing on Q2ON and Q4ON will be sufficient to turn Q2 and Q4 on and off.

Fault detection means is provided by over-current detector and limiter circuits 56, and open load detector circuit 58 and a timer input integrating circuit 60. The over-current detector has applied thereto the outputs across the sensing resistors 33, 34, 36 and 38 which are indicated as being QI H&L, Q3 H&L, Q2 H&L and Q4 H&L. The over-current detector monitors the voltage difference and therefore the current across each of these pairs of inputs, at all times and provides outputs for protection against over-currents. Reference voltages are generated in the over-current detector 56 against which the current sensing means, provided by the shunt circuits of transistors 26, 30, 28 and 32 and the sensing resistors 33, 34, 36 and 38 in series therewith, exceed preset limits. OVCQ1, 3 indicates by being high an over-current in high side transistor Q1 or Q3 or both thereof. Similarly OVCQ2, 4 indicates an over-current in low side transistors Q2 or Q4 or both thereof. Limiter outputs Q1LIM, Q2LIM, Q3LIM and Q4LIM are connected to the DG1, DG2, DG3 and DG4 inputs to the H-bridge and reduce the drive voltages to the gates of the transistors Q1, Q2, Q3 and Q4 so as to reduce conduction therethrough to safe levels.

The open load detector 58 monitors OUT1, OUT2, OL1 and OL2 and compares the voltages therebetween in the detector 58. In other words, the difference between OUT1 and OL1 and the difference between OUT2 and OL2 are monitored and compared to detect the open load condition. The output from the open load detector OPNLD, as well as the OVCQ1,3 and OVCQ2,4 are levels that are applied as inputs to the timer circuit 60. The timer circuit integrates these levels and compares them with internally generated references so that fault condition outputs (FLT) are provided only when these levels (which may be five volt high logic levels to indicate a fault event) are continuously on for a predetermined period of time, for example, 30 microseconds, thereby providing noise immunity in the system. The timer circuit produces the FLT as an output level when a fault is detected.

The fault detection control logic 50 provides outputs Q1234OC, Q2OL and Q4OL that enable and inhibit the fault detector from providing the FLT output during operating conditions. False faults may be produced indicated by the outputs Q1HL–Q4HL, which sense over currents and by Q2OL and CQ4OL which sense open load conditions in the bridge circuit 16. The output that enables and inhibits over-current fault condition detection Q1234OC is applied to enable or inhibit the timer circuit 60. The outputs that enable and inhibit open load detection, Q2OL and Q4OL enable and inhibit the open load detector 58.

The fault detection logic also forwards the input signals via the H-bridge driver 52 to the H-bridge 16. It is desirable, in order to prevent untimely switching on and off of Q1, Q2, Q3 and Q4 and voltage spikes in these transistors which may damage the transistors or their internal clamping diodes, that the sources and gates of each of the transistors be monitored. The sources of the transistors SQ1, SQ2, SQ3 and SQ4 and gates DG1, DG2, DG3, DG4 are compared with the signals Q1ON, Q2ON, Q3ON and Q4ON in the H-bridge driver 52, so that outputs appear that are applied to gates in the fault detection control logic 50, for preventing turn on of the transistors Q1, Q2, Q3 and Q4 at times where spikes may occur. For example, a current spike may occur through Q4 if Q4 is not in its off state before Q3 is put into its on state. The logic in the fault detection logic responds to the Q4, Q3, Q2 and Q1 inhibit signals from the driver 52 to prevent such possible spike producing conditions thereby preventing damage to the transistors in the bridge circuit 16.

The circuit in the fault detection logic 50 includes a circuit for comparing the supply voltage VS with a reference voltage so as to ensure that the transistors Q1, Q2, Q3 and Q4 are driven to their off state unless the supply voltage is above a predetermined voltage, for example, 4.5 volts where VS is nominally 12 volts. In addition, a temperature monitoring circuit may be contained in the circuits 50 for the purpose of driving the transistors Q1, Q2, Q3 and Q4 to their off condition when the temperature of the chip, especially in the area containing the transistors Q1, Q2, Q3 and Q4 exceeds a predetermined, unsafe temperature.

The fault detection control logic 50 analyzes the inputs as presented at CIN1, CIN1N, CIN2 and CIN2N, as well as the sequence in which these inputs occur, in order to detect operating conditions that are likely to produce false fault detection. The logic 50 is clocked by P1 and P2 so as to enable the sequence of the input signals, IN1 and IN2, thereto to be detected, as well as the states thereof. The logic thus detects the states represented by the inputs as are shown in Table 1 and the sequence of occurrence thereof to provide the Q1234OC, the Q2OL and Q4OL's outputs. High, Q2OL outputs occur only for the states when Q2 and Q3 are on and the motor 10 is driven in one direction. Similarly, Q4OL appears high only when the motor is driven in the opposite direction and Q1 and Q4 are on. At all other times, the open load detector 58 is inhibited by the Q2OL and Q4OL outputs.

The logic 50 also prevents the enabling Q2OL and Q4OL inputs to be applied under conditions where the motor reverses direction. This is indicated by successive occurrence of S1 and S2 states. There may be an intermediate change of state, between S1 and S2 or S2 and S1 successive states, for purposes of pulse width modulation, to cut current flow off for periods of time sufficient to reduce the average motor current and thereby control motor speed. The interval of time when fault detection is enabled is the interval between changes of state in which the period the pulse width modulated input control signal, IN1 is high. In these states, either Q2 or Q4 is driven off, then current continues to flow through the motor in the same direction but Q1 or Q3 is driven on and circulation through the motor is between Q1, the motor and Q3 back to the power supply (e.g., a battery that provides the supply to the power supply) or Q3, the motor and Q1.

FIG. 3 indicates a typical sequence of pulse modulation control inputs IN1 and direction control inputs IN2 and the resulting Q2OL and Q4OL enabling signals. Q2OL occurs only when the motor is driven to rotate in one direction, when state S2 is selected by the input control signals, unless a reversal is then occurring or turn on occurs from a high Z state. Similarly, Q4OL is generated by the logic 50 only when the motor is driven in the opposite direction (state S1) and there is no reversal or high Z condition during the occurrence of any of such states. The initial turn on is shown as from the high Z state to the S1 state.

The pulse width modulation occurs during state S3 when the low side transistors Q2 and Q4 are both off. Then the high side transistors Q1 and Q3 through which current flows via the motor 10 are pulsed on and off at the requisite duty cycle to obtain the desired motor speed. Similarly, during state S4, Q2 and Q4 are also off and Q1 and Q3 are pulsed so as to enable current flow through the motor in the opposite direction with the desired duty cycle to obtain the desired motor speed. The pulsing of Q1 and Q3 during the various states to obtain motor rotation in opposite directions and to pulse width modulate the motor through the current are shown along lines Q1, Q2, Q3 and Q4 in FIG. 3. At these times, the outputs at OUT1 and OUT2 are pulse width modulated as indicated along the lines OUT1 and OUT2 in FIG. 3. The various states of the outputs are indicated adjacent lines OUT1 and OUT2, as well as in Table 1.

Q1234OC is a high level enabling the over-current fault output to be integrated in the timer circuit 60, except during states where reversal of direction is commanded by the input control signals. The initial turn on is shown as from the high Z state to the S1 state. FIG. 3 illustrates above line designating the state sequence, the initial turn on state sequence, and the successive S1 and S2 states, or S2 and S1 states, which indicate a direction reversal RD.

Accordingly, the H-bridge is monitored for open load and over-current conditions. Over-current is monitored at all times except when the motor reverses its direction of rotation. Open load fault detection is monitored in states S1 or S2 except when the motor turns on from a high Z condition or the motor reverses its direction of rotation. Nevertheless, continuous monitoring of over-current conditions occurs and current is limited by the over-current limiter 56. Thus, the bridge 16 is safeguarded against over-currents, but faults that may be false are prevented from being detected.

From the foregoing description, it will be apparent that there has been provided an improved automatic fault monitoring system and a motor control system having an H-bridge that incorporates the automatic fault monitoring and in which false fault detection is prevented. Variations and modifications in the herein described system and circuits, within the scope of the invention, will undoubtedly suggest themselves to those skilled in the art. Accordingly, the foregoing description should be taken as illustrative and not in a limiting sense.

I claim:

1. A system for monitoring a circuit which drives a load in response to control signals, which select a plurality of operating conditions for fault conditions in said circuit, which system comprises means in said circuit for providing a plurality of outputs representing the operating conditions of said circuit, means for detecting said fault conditions, and means responsive to said control signals for enabling and inhibiting said fault detecting means to prevent operation of said fault detecting means upon selection of certain of said operating conditions;

wherein said fault detecting means comprises means responsive to first ones of said plurality of outputs for detecting a circuit through said load being open as a first fault event, and means responsive to second ones of said plurality of outputs for detecting current through said load exceeding a certain limit as a second fault event; and wherein said enabling and inhibiting means comprises means responsive to said control signals which represent a first operating condition where current to said load reverses direction for inhibiting said fault detecting means from detecting said first event, and said enabling and inhibiting means further comprises means responsive to said control signals which represent second and third operating conditions where current flows through said load in first or second opposite directions for enabling said fault detecting means for detecting said second event while inhibiting said fault detecting means from detecting said second event when said control signals represent said first operating condition.

2. The system according to claim 1 wherein said fault detecting means comprises means responsive to second ones of said plurality of outputs for detecting current through said load exceeding a certain limit as a fault event.

3. The system according to claim 1 wherein said fault detecting means comprises means responsive to said first or second fault event persisting for a certain period of time to represent the fault condition.

4. The system according to claim 3 further comprising means for inhibiting said circuit from driving said load upon occurrence of said fault condition.

5. The system according to claim 6 wherein said means responsive to said control signals for enabling and inhibiting said fault detecting means includes means for processing said control signals to provide to said circuit outputs corresponding to the operating conditions selected by said control signals, and said means for inhibiting said circuit from driving said load being included in said processing means.

6. A system for monitoring a circuit which drives a load in response to control signals, which select a plurality of operating conditions for fault conditions in said circuit, which system comprises means in said circuit for providing a plurality of outputs representing the operating conditions of said circuit, means for detecting said fault conditions, and means responsive to said control signals for enabling and inhibiting said fault detecting means to prevent operation of said fault detecting means upon selection of certain of said operating conditions wherein said load is a motor operated by direct current, and said circuit is a bridge having four arms each containing a separate active switching device, said bridge also having a leg containing said motor connected between pairs of said arms across which pairs DC power is applied, said operating conditions including opposite directions of rotation and reversal of direction of rotation between said opposite directions of rotation, and an open circuit in said leg, and said means providing said outputs comprises means for sensing current flow in said arm and in said leg, and said fault detecting means comprises circuits responsive to said sensing means which are enabled and inhibited by said control signal responsive means for providing fault condition representing outputs upon occurrence of over-current in said arm and open circuit in said leg during said operating condition of opposite directions of rotation and not during said reversal of direction operating condition.

7. The system according to claim 6 wherein said enabling and inhibiting means is provided by first logic circuits having inputs corresponding to said control signals which represent a plurality of operating states of said active switching devices during which said different ones of said operating conditions occur, said first logic circuits having means responsive to successively occurring ones of said states representing a reversal of direction of rotation of said motor for providing first outputs to said fault detecting means upon occurrence of the last of said successively occurring states and second outputs upon occurrence of states representing motor rotation in either of said opposite directions, said fault detecting means also comprising second logic circuits responsive to said sensing means and to said outputs of said first logic circuit for providing over current fault condition representing outputs when enabled by said second outputs and open circuit fault condition representing outputs except when inhibited by said first outputs.

8. The system according to claim 7 further comprising a computer controlled by a controller which selects said operating conditions for providing said inputs, said first logic circuit having means responsive to said fault condition representing outputs for providing a flag command to said computer indicative of said fault condition.

9. The system according to claim 7 wherein said first logic circuits comprise means for generating outputs which switch all of said active devices off upon detection of said fault conditions.

10. The system according to claim 7 wherein said active devices in each arm include first transistors of sufficient current carrying capacity to pass current for driving said motor into rotation, said transistors having gates, sources and drains, the sources and drains of said transistors in said pairs of arms of said bridge being connected to define corners of said bridge between which said leg containing said motor is connected, and further comprising a driver circuit having first outputs connected to the gates of said transistors, first inputs connected to the sources of said transistors and second inputs via which said first outputs connected to said gates are driven, second outputs providing the on and off conditions of said first transistors presented at said sources, and said first logic circuits having means for transferring said inputs corresponding to said control signals to said second inputs of said driver unless inhibited by said second outputs of said driver.

11. The system according to claim 10 wherein said fault detecting means which provides outputs representing over-current in said arms also has means connected to said gates for limiting the voltage applied thereto and thereby limiting current flowing in said arms between said sources and drains of the transistors therein when over-current conditions are detected.

12. The system according to claim 7 wherein said system except for said motor is contained in an integrated circuit chip.

13. The system according to claim 6 wherein said active devices of each arm include first DMOS transistors of sufficient current carrying capacity to pass current for driving said motor into rotation, said transistors having gates, sources and drains, the sources and drains of said transistors in said pairs of arms of said bridge being connected to define corners of said bridge between which said leg containing said motor is connected.

14. The system according to claim 13 wherein said current sensing means comprises circuits having second DMOS transistors and sensing resistors connected across said first DMOS transistors between source and drain thereof.

15. The system according to claim 13 wherein opposite arms in different ones of said pairs of arms which are connected to opposite ends of said legs also have separate second DMOS transistors therein, said second transistors each having a gate connected to the gate of the transistor in the same arm therewith and a drain connected to the drain of said transistor in said same arm, whereby the voltages between said sources of said second transistors and the ends of said leg represent whether the circuit therein is an open circuit.

16. The system according to claim 13 wherein said arms in different ones of said pairs of arms which are connected to opposite ends of said leg each include a second transistor each having a gate, a source and a drain, said gates of both said first DMOS transistor and said second transistor and said drains of both said first DMOS transistor and said second transistor being interconnected and said outputs representing open circuit conditions on said leg being provided by the voltage between said gates and the opposite ends of said leg.

* * * * *